US012592982B2

(12) United States Patent
    Furusawa

(10) Patent No.: US 12,592,982 B2
(45) Date of Patent: Mar. 31, 2026

(54) INFORMATION PROCESSING DEVICE AND STORAGE MEDIUM

(71) Applicant: TOYOTA JIDOSHA KABUSHIKI KAISHA, Toyota (JP)

(72) Inventor: Toru Furusawa, Yokohama (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/753,497

(22) Filed: Jun. 25, 2024

(65) Prior Publication Data

US 2025/0106278 A1    Mar. 27, 2025

(30) Foreign Application Priority Data

Sep. 22, 2023    (JP) ................................. 2023-158727

(51) Int. Cl.
     *H04L 67/1008*        (2022.01)
(52) U.S. Cl.
     CPC ................................ *H04L 67/1008* (2013.01)
(58) Field of Classification Search
     None
     See application file for complete search history.

(56) References Cited

U.S. PATENT DOCUMENTS

2021/0014133 A1*  1/2021  Maciocco ........... H04L 41/5009
2021/0028991 A1*  1/2021  Nataraj ................... H04L 41/16
2022/0150666 A1   5/2022  Kozhaya et al.

FOREIGN PATENT DOCUMENTS

JP        2022-077504 A      5/2022

OTHER PUBLICATIONS

Furusawa et al., "A Service Mesh Controller for Cooperative Load Balancing of Neighboring Edge Servers", IEICE Technical Report, vol. 121, Iss. 433, pp. 152-157, (Mar. 3, 2022).
Furusawa et al., "Cooperative Load Balancing of Neighboring Edge CLouds with LISP", IEICE Technical Report, vol. 122, Iss. 406, pp. 13-18, (Feb. 23, 2023).

* cited by examiner

*Primary Examiner* — June Sison
(74) *Attorney, Agent, or Firm* — SoraIP, Inc.

(57) ABSTRACT

An information processing device for performing load balancing between a plurality of edge servers. Acquire a load on one or more microservices operating at each of the plurality of edge servers, and determine to operate at the first edge server to forward a predetermined percentage of requests of one or more requests issued to the first microservice loaded by a predetermined amount or more to a second microservice operating at the one or more second edge servers.

5 Claims, 6 Drawing Sheets

INFORMATION PROCESSING DEVICE AND STORAGE MEDIUM

CROSS-REFERENCE TO RELATED APPLICATION

This application claims priority to Japanese Patent Application No. 2023-158727 filed on Sep. 22, 2023, incorporated herein by reference in its entirety.

BACKGROUND

1. Technical Field

The present disclosure relates to edge computing.

2. Description of Related Art

In an information processing system that performs processing by a plurality of edge servers, there is technology for performing load distribution among edge servers. For example, Japanese Unexamined Patent Application Publication No. 2022-077504 (JP 2022-077504 A) discloses a device for predictively deploying microservices in a network including edge servers.

SUMMARY

As new technologies such as machine learning become widespread, the importance of edge servers providing computational resources to mobile bodies is thought to increase.

An object of the present disclosure is to reduce a load of an edge server on which a microservice is operating.

One aspect of the embodiment of the present disclosure is an information processing device including a control unit that executes acquiring a load on one or more microservices operating in each of a plurality of edge servers, and determining to transfer a certain proportion of requests out of one or more requests issued with respect to a first microservice that operates on a first edge server is under a predetermined load or greater, to a second microservice that operates on one or more second edge servers.

One aspect of the embodiment of the present disclosure is a storage medium storing a program that causes a computer to execute acquiring a load on one or more microservices operating in each of a plurality of edge servers, and determining to transfer a certain proportion of requests out of one or more requests issued with respect to a first microservice that operates on a first edge server is under a predetermined load or greater, to a second microservice that operates on one or more second edge servers.

Also, examples of other aspects include a method executed by the above-described device, and a computer-readable storage medium storing the above-described program in a non-transitory manner.

According to the present disclosure, the load on the edge server on which the microservice is operating can be reduced.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
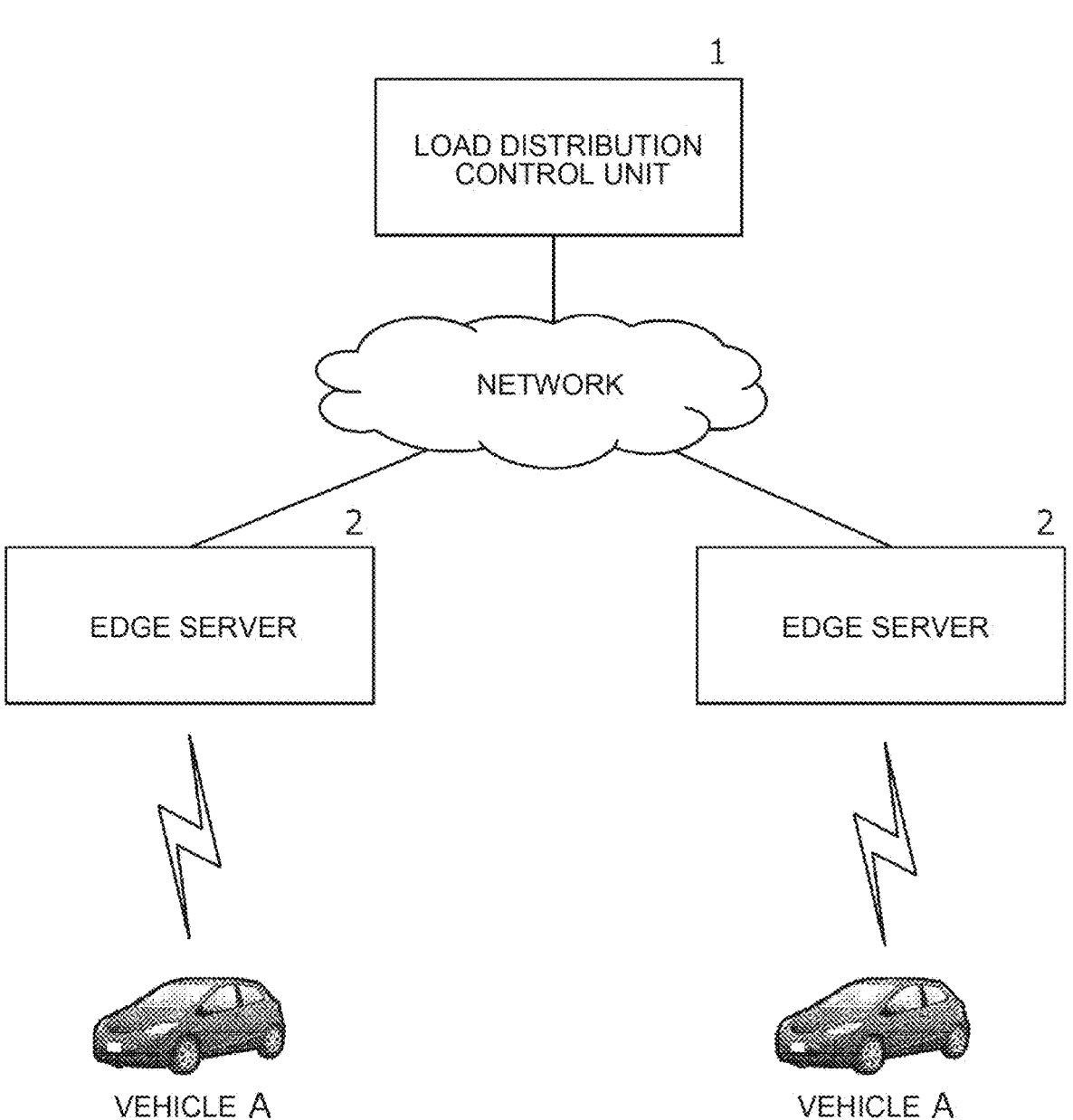
FIG. 1 is a schematic diagram of an edge computing system according to an embodiment.

As an architecture for reducing delay and traffic, there is an edge computing system in which an edge server is arranged between a terminal and a cloud, and a request from the terminal is processed by the edge server. For example, when a terminal is mounted on a vehicle (connected car), the amount of access from the vehicle to each edge server changes in conjunction with the amount of traffic, and thus there is a possibility that a load bias may occur on some edge servers. When the load is biased to some edge servers, the edge servers may not exhibit predetermined performance.

In order to cope with this, a system has been devised in which a request from a terminal is transferred between edge servers based on an amount of a request issued to each edge server and a resource that can be provided in each edge server so that a load is not biased to some edge servers.

Incidentally, in recent years, a case in which a microservice architecture is adopted in an edge server is increasing. The microservice architecture is an architecture in which requests are processed in a distributed manner by a plurality of microservices. In a microservice architecture, for example, a plurality of microservices cooperate in one edge server to provide one application.

In such an architecture, since resources are allocated in units of microservices, it may not be possible to accurately determine whether or not an overload condition has occurred by referring to the total amount of requests arriving from the terminal to the edge server and the remaining amount of hardware resources of the edge server. For example, even when a load is concentrated on a specific microservice and processing through the microservice is delayed, this cannot be detected.

In order to solve this problem, it is necessary to determine the load status for each microservice operating in the edge server.

An information processing device according to a first aspect of the present disclosure includes:

a control unit that executes acquiring a load on one or more microservices operating in each of a plurality of edge servers, and determining to transfer a certain proportion of requests out of one or more requests issued with respect to a first microservice that operates on a first edge server is under a predetermined load or greater, to a second microservice that operates on one or more second edge servers.

An information processing device according to the present disclosure is a control apparatus for performing load balancing between a plurality of edge servers. For example, the control unit is configured to be capable of individually monitoring loads of a plurality of microservices operating in each of a plurality of edge servers. The load of each microservice can be acquired, for example, by measuring the round trip time for the request. The control unit transfers a predetermined ratio of the one or more requests issued to the microservices (also referred to as first microservices) determined to be loaded by a predetermined amount or more to the second microservices. The second microservice may be, for example, a resource-rich microservice running at another edge server.

Note that the control unit may detect, as a trigger, the presence of the first microservice, that the value related to the performance of the application is worse than the predetermined value. For example, if the throughput of the first application falls below a predetermined value, the control unit may measure the time required for processing each of the one or more microservices. For example, the control unit can identify a microservice whose time exceeds a predetermined value as a first microservice (loaded by a predetermined amount or more).

Note that the control unit may determine a predetermined ratio in consideration of the load of the second microservice when transferring the request. For example, the control unit may determine a predetermined ratio such that both the load on the first microservice and the load on the second microservice are below a predetermined value.

In addition, the control unit may change the predetermined ratio according to the load state after the start of the transfer of the request, or may stop the transfer of the request depending on the state. For example, when the load applied to the second microservice exceeds a predetermined value after the start of the transfer, the transfer may be stopped.

Hereinafter, specific embodiments of the present disclosure will be described with reference to the drawings. The hardware configuration, the module configuration, the functional configuration, and the like described in each embodiment are not intended to limit the technical scope of the disclosure to only those unless otherwise specified.

First Embodiment

An outline of the edge computing system according to the first embodiment will be described with reference to FIG. 1. The edge computing system according to the present embodiment includes a plurality of edge servers 2 and a load distribution control unit 1. In the edge computing system according to the present embodiment, each of the plurality of vehicles A is connected to any one of the plurality of edge servers 2 via wireless communication.

The vehicle A is an automobile equipped with a terminal capable of performing wireless communication with the edge server 2. The vehicle A (in-vehicle terminal) can provide a predetermined service to the occupant by communicating with any one of the plurality of edge servers 2.

Each of the plurality of edge servers 2 is arranged in each area so as to be able to process a request from the terminal at a position closer to the terminal than the cloud. For example, the edge server 2 receives the request transmitted from the vehicle A, performs predetermined processing, and returns the result to the vehicle A. Although omitted in FIG. 1 for simplicity, a relay device such as a base station, an access point, or a router may be present between the edge server 2 and the vehicle A, for example. The request from the vehicle A reaches the edge server 2 via these relay devices.

The load distribution control unit 1 is a device that manages a plurality of edge servers 2. In the present embodiment, the load distribution control unit 1 monitors the load of each edge server 2. The load distribution control unit 1 causes the edge server 2 to transfer the request transmitted from the vehicle A to the other edge server 2 in order to distribute the load when the load is biased to the specific edge server 2. In the present embodiment, as an example of the load, the number of requests issued to the application in the edge server 2 per unit time is exemplified.

The load distribution control unit 1 and the edge servers 2 are configured to be able to communicate with each other via a network. The network is, for example, a public network such as the Internet or a backbone network such as an optical network.

In the present embodiment, a plurality of edge servers 2 are arranged in a geographically distributed manner. Each edge server 2 may have a defined geographic area or communication area in charge. For example, the edge server 2 may cooperate with a relay device such as a base station and a router, and in this case, may be in charge of an area covered by the relay device that cooperates. The edge server 2 receives from the vehicle A existing in the area in charge, and performs processing.

On the edge server 2, a plurality of microservices is operating, and the plurality of microservices cooperate to provide a service of a predetermined application. Note that a plurality of applications may be operable on the edge server 2, but in the present embodiment, one application is assumed to operate on the edge server 2 for the sake of simplicity of description.

In the present embodiment, it is assumed that the same application is operating in the plurality of edge servers 2, and a microservice having the same configuration is operating in order to provide the application.

The request input to the application is allocated to each microservice, and processing proceeds when a plurality of microservices transmit and receive the request.

Further, the edge server 2 is configured to be able to notify the load distribution control unit 1 of information regarding a load applied to an operating microservice. The notification of the information regarding the load may be triggered by the edge server 2 or may be triggered by the load distribution control unit 1.

Based on the information received from each edge server 2, the load distribution control unit 1 detects that there is a microservice in an overload state in any of the edge servers 2. The overload state refers to a state in which a request equal to or larger than the amount of requests that can be processed by each microservice is received per unit time.

When detecting that there is a microservice in an overload state, the load distribution control unit 1 transfers a predetermined ratio of requests issued per unit time to the microservices to other microservices executing in the other edge servers 2 in order to reduce the load of the microservices. The predetermined ratio is appropriately determined according to the load states of the transfer source and the transfer destination microservices.

For example, when the number of requests issued to the microservices in the overload state is larger, the load distribution control unit 1 allocates more requests to the microservices operating in the other edge servers 2. When the surplus resource of the microservice to which the request is transferred is small, the transfer rate is set lower than when the resource is large.

As a result, it is possible to suppress other microservices serving as a transfer destination of a request from a microservice in an overload state from being placed in an overload state due to the transfer of the request, and thus it is possible to efficiently perform load distribution.

Device Configuration

Figure 2:
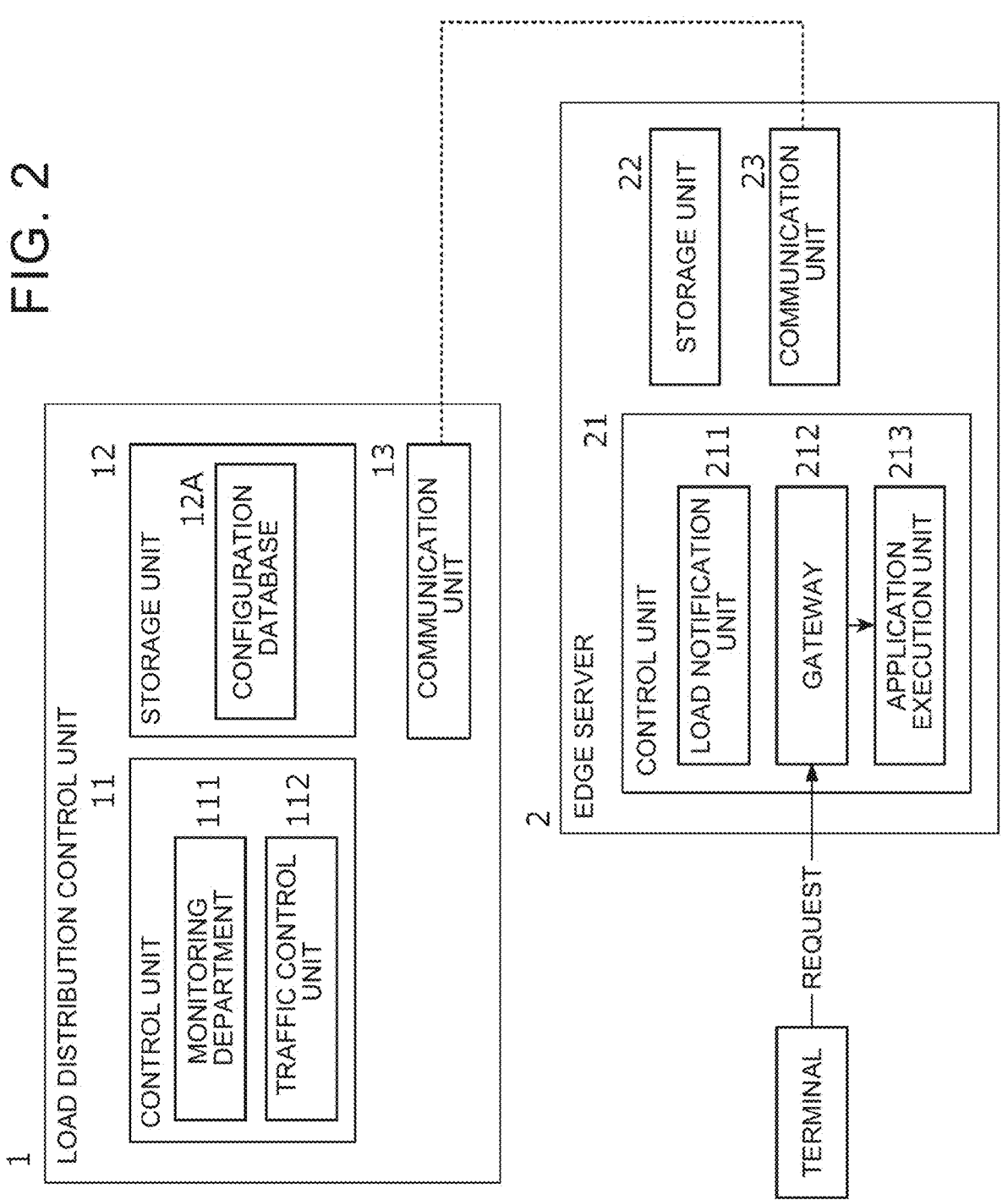
FIG. 2 is a configuration diagram of a load distribution control unit and an edge server.

Next, the configuration of each device constituting the system will be described. FIG. 2 is a diagram schematically illustrating an example of a configuration of the load distribution control unit 1 and the edge server 2 according to the present embodiment.

First, the load distribution control unit 1 will be described.

The load distribution control unit 1 can be configured as a computer including a processor (such as a CPU, GPU), a main storage device (such as a RAM, ROM), and a secondary storage device (such as a EPROM, a hard disk drive, and a removable medium). The secondary storage device stores an operating system (OS), various programs, various tables, and the like. By executing the program stored in the auxiliary storage device, it is possible to realize each function (software module) that matches a predetermined purpose, as will be described later. However, some or all of the functions may be realized as a hardware module by, for example, hardware circuitry such as a ASIC, FPGA.

The load distribution control unit 1 includes a control unit 11, a storage unit 12, and a communication unit 13.

The control unit 11 is an arithmetic unit that realizes various functions of the load distribution control unit 1 by executing a predetermined program. The control unit 11 can be realized by, for example, a hardware processor such as a CPU. In addition, the control unit 11 may be configured to include Random Access Memory (RAM), Read Only Memory (ROM), a cache memory, and the like.

The control unit 11 includes two software modules, a monitoring unit 111 and a traffic control unit 112. The respective software modules may be realized by executing a program stored in the storage unit 12, which will be described later, by the control unit 11 (for example, a CPU).

The monitoring unit 111 monitors a load in the edge server 2 to be managed. In the present embodiment, the monitoring unit 111 periodically communicates with each edge server 2. The monitoring unit 111 acquires information on a load applied to a microservice in operation. Based on the data, the monitoring unit 111 determines whether or not there is a microservice that is in an overload state among the microservices operating in each edge server 2.

When it is determined by the above-described processing that there is a microservice in an overload state, the traffic control unit 112 determines to transfer a request for the microservice to another microservice operating in the other edge server 2. Further, the traffic control unit 112 generates a command (hereinafter, referred to as a transfer command) for performing the transfer, and transmits the command to the target edge server 2. The transfer command is a command for transferring a request issued to a microservice operating in the predetermined edge server 2 to another microservice operating in the other edge server 2. The edge server 2 that has received the transfer command transfers the request for the target microservice to the other edge server 2. A specific method will be described later.

The storage unit 12 is a unit that stores information, and is configured by a storage medium such as a RAM, a magnetic disk, or a flash memory. The storage unit 12 stores a program executed by the control unit 11, data used by the program, and the like. In addition, the storage unit 12 stores a configuration database 12A that is information indicating the configuration of the edge server 2 that is managed. The configuration database 12A includes, for example, a network configuration of each edge server 2, a hardware configuration, a software configuration, and information related to an application operating in each edge server 2.

The communication unit 13 is a communication module that communicates with a predetermined network. The communication unit 13 is, for example, a Network Interface Card (NIC), an optical line interface, or the like. The communication unit 13 connects to an access network such as a Local Area Network (LAN) or an optical line network by wire, for example, and connects the load distribution control unit 1 to the network through the access network.

Next, the configuration of the edge server 2 will be described.

Like the load-distribution control unit 1, the edge server 2 can also be configured as a computer including a processor (such as a CPU, GPU), a main storage device (such as a RAM, ROM), and an auxiliary storage device (such as a EPROM, a hard disk drive, and a removable medium). Like the load distribution control unit 1, the edge server 2 may be implemented as a hardware module, for example, by hardware circuitry such as a ASIC, FPGA.

The edge server 2 includes a control unit 21, a storage unit 22, and a communication unit 23.

The control unit 21 is an arithmetic unit that realizes various functions of the edge server 2 by executing a predetermined program. The control unit 21 can be realized by, for example, a hardware processor such as a CPU. The control unit 21 may include a RAM, ROM, a cache memory, and the like.

The control unit 21 includes three software modules: a load notification unit 211, a gateway 212, and an application execution unit. The respective software modules may be realized by executing a program stored in the storage unit 12, which will be described later, by the control unit 21 (for example, a CPU).

The load notification unit 211 transmits information on the performance of an application operating in the edge server 2 or the load of the microservice to the load distribution control unit 1.

The load notification unit 211 may measure a value related to the performance of a predetermined application based on an inquiry from the load distribution control unit 1 and notify the load distribution control unit 1 of the measured value. Examples of the value related to the performance of the application include processing throughput.

Further, the load notification unit 211 may measure a value related to the load of the microservice based on an inquiry from the load distribution control unit 1 and notify the load distribution control unit 1 of the value. As the information on the load of the microservice, for example, the number of requests received by the target microservice per unit time, the time required for processing, and the like can be exemplified.

The gateway 212 receives a request from a terminal included in the edge computing system. The request is a request issued to an application executed in the edge server 2. In the present embodiment, the terminal that transmits the request is typically an in-vehicle terminal mounted on a vehicle in an area covered by the edge server 2. The target terminal may be a terminal connected to a relay device such as a base station and a router installed in an area covered by the edge server 2. The gateway 212 outputs the request received from the terminal to the application execution unit 213.

The application execution unit 213 executes a predetermined application in response to the request. In response to a request from a terminal, the predetermined application performs processing and returns the result, thereby providing a predetermined service to the terminal. In the application execution unit 213, a plurality of microservices is executed, and a predetermined application is implemented by the plurality of microservices. The application execution unit 213 may be configured to execute a plurality of micro-services by, for example, Kubernetes of container orches-tration software.

Figure 3:
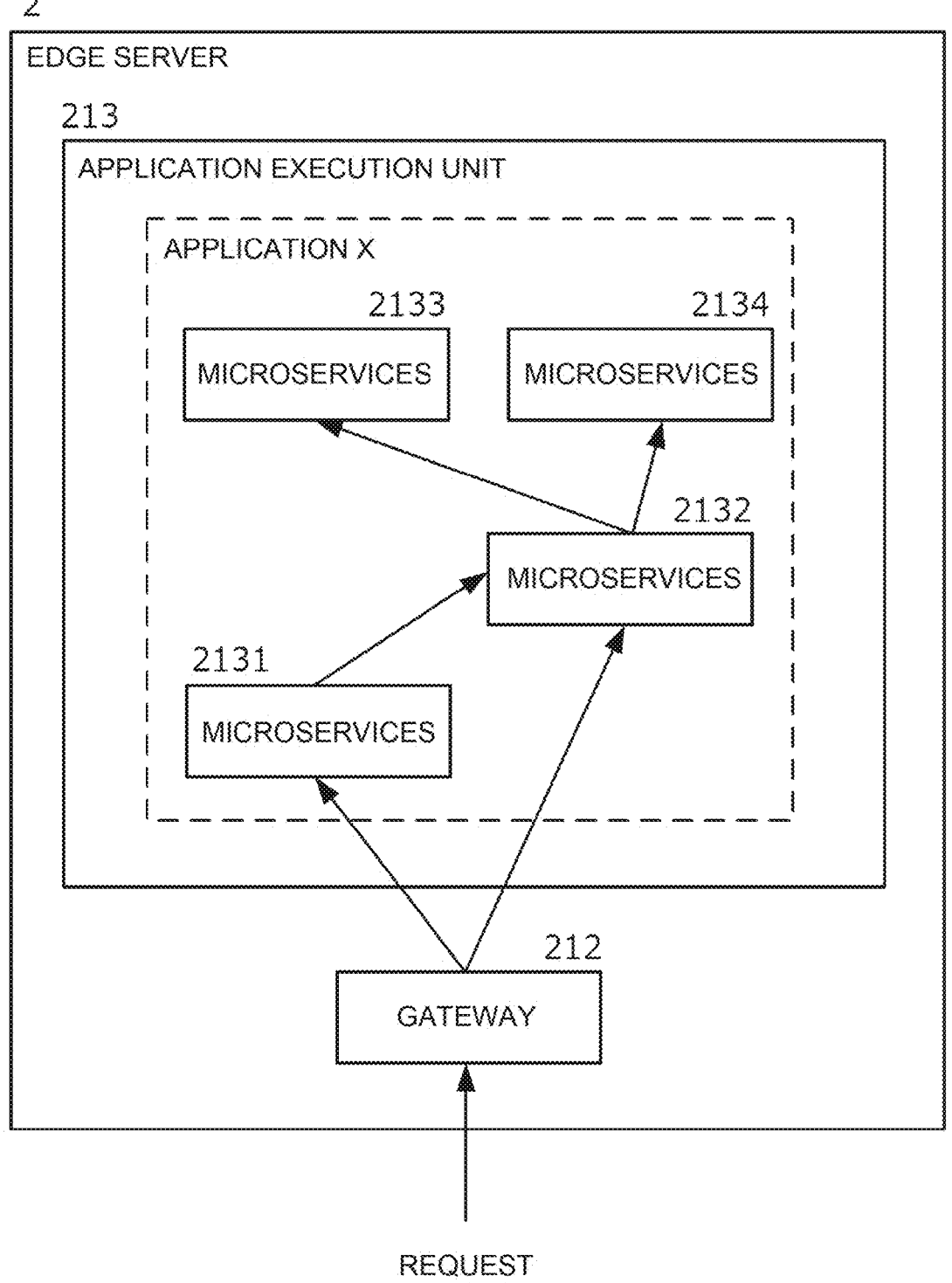
FIG. 3 is a schematic diagram of a microservice executed at an edge server.

FIG. 3 is a diagram illustrating an outline of an applica-tion executed by the application execution unit 213. As illustrated in the figure, the request received by the gateway 212 is input to a microservice that constitutes the target application. Further, the final calculation result is obtained by passing the processing result and the request between the microservices. In the example illustrated in the figure, the request received by the gateway 212 reaches the microser-vice 2132 in two paths, and the microservice 2132 issues a request to the microservices 2133 and 2134, respectively. The processing results of the microservices 2133 and 2134 are transmitted to the terminal via the gateway 212.

In the present embodiment, as illustrated in FIG. 3, the application execution unit 213 transmits and receives a request between a plurality of microservices on a predeter-mined path. In addition, the application execution unit 213 changes the transmission destination of the request so as to avoid the microservice in the overload state based on the transfer command received from the load distribution con-trol unit 1. Specifically, when the transfer command is received from the load distribution control unit 1, the application execution unit 213 transfers the request issued to the target microservice to the other edge server 2 based on the contents of the received transfer command.

How to Balance Loads

Next, a specific example of a method in which the load distribution control unit 1 detects an overload state in the plurality of edge servers 2 included in the system and transfers a request between the edge servers to perform load distribution will be described.

Figure 4:
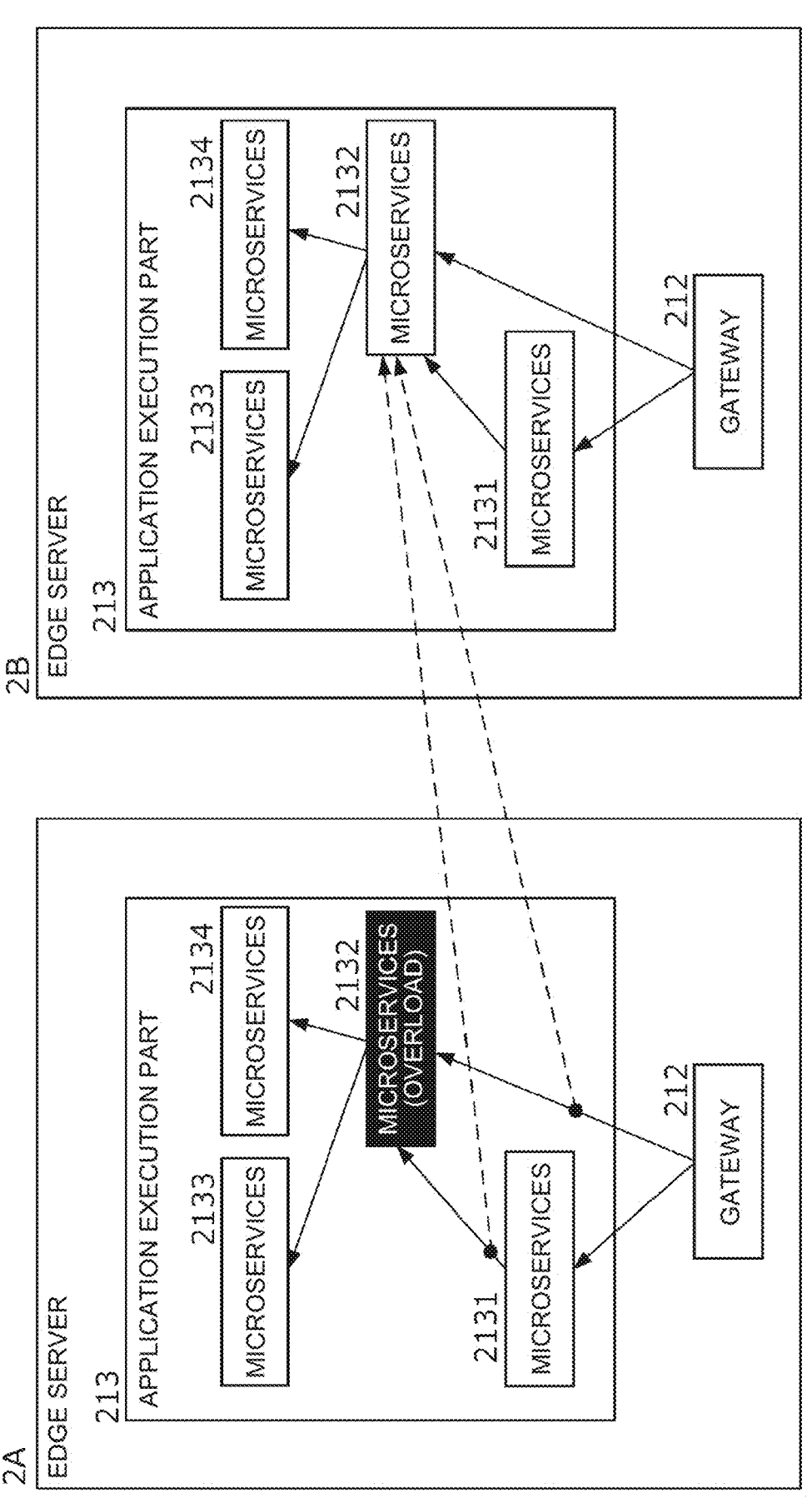
FIG. 4 is a diagram for explaining transfer of a request between microservices.

FIG. 4 is a diagram for explaining a method of load balancing between edge servers. In the present embodiment, the edge server from which the request is forwarded is referred to as an edge server 2A, and the edge server to which the request is forwarded is referred to as an edge server 2B. In both the edge server 2A and the edge server 2B, the same application is executed. In the edge server 2A and the edge server 2B, microservices having the same configu-ration are executed. The edge server 2A and the edge server 2B may be located at geographically distant locations.

Here, it is assumed that one of the microservices (here, the microservices 2132) executed in the edge server 2A is overloaded. The overload condition occurs, for example, when the number of terminals simultaneously connected to the edge server 2A is excessively increased.

When the microservice 2132 enters an overload state, the microservice becomes a bottleneck, which affects subse-quent processing. For example, in this example, processing of the microservices 2133 and 2134 may be delayed. Con-sequently, the application provided by the edge server 2A may be significantly degraded in performance.

In the present embodiment, the load distribution control unit 1 monitors the performance of an application running on each edge server 2.

For example, the load distribution control unit 1 stores a value (e.g., throughput, etc.) related to the performance of an application operating in each edge server 2 in a normal state. The load distribution control unit 1 detects that a perfor-mance degradation has occurred in an operating application.

Figure 5:
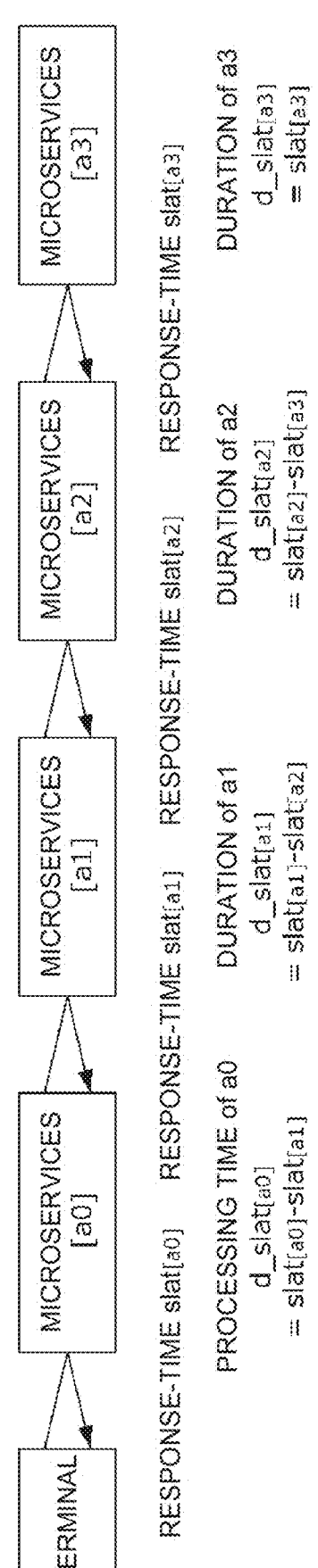
FIG. 5 is a diagram for explaining a process of determining a bottleneck.

An example of a specific method will be described. FIG. 5 is a diagram illustrating a relationship between a request passed between a plurality of microservices and a response time. Here, it is assumed that there are a0 to a3 four microservices. The response time may also be referred to as a round trip time. For example, the response time of the microservice a0 is the time from when the request is entered into the microservice a0 until the request reaches the micro-service a3 and a response is returned.

In a normal state, a response time from when the terminal issues a request to the microservice a0 until a response is obtained is set as slat [a0]. Similarly, let slat [a1] the response time from when the microservice a0 makes a request to the microservice a1 until a response is obtained. Here, by subtracting slat [a0] from slat [a1], it is possible to obtain the process duration d_slat [a0] of the microservice a0 itself. The same applies to other microservices.

The load distribution control unit 1 stores, for each microservice, a processing time (processing time required in a normal state) calculated by such a method.

In addition, the load distribution control unit 1 causes the edge server 2 (load notification unit 211) to measure the processing time of each microservice in a case where a load is applied by the same method. By comparing them, it is possible to identify a microservice in which the processing time is increased by a predetermined value or more as compared with a normal state.

Returning to FIG. 4, the description will be continued. Here, it is assumed that the load distribution control unit 1 (monitoring unit 111) determines that the microservice 2132 is in an overload state. To reduce the load on the microser-vices 2132, it is necessary to reduce the number of requests sent from the microservices 2131 to the microservices 2132 or the number of requests sent from the gateway 212 to the microservices 2132. Therefore, the load distribution control unit 1 (the traffic control unit 112) transmits a transfer command to the application execution unit 213 of the edge server 2A, thereby causing a part of the request addressed to the microservice 2132 to be transferred to another edge server (the edge server 2B in the present embodiment).

The distribution of the loads is performed by directing a certain percentage of the plurality of requests addressed to the target microservices to another edge server 2 (in this embodiment, the microservices 2132 executed in the edge server 2B).

For example, the traffic control unit 112 of the load distribution control unit 1 determines to forward N % of the requests transmitted from the microservice 2131 to the microservice 2132 executed in the edge server 2B. It also determines to forward M % of the requests sent from the gateway 212 to the microservice 2132 to the microservice 2132 running on the edge server 2B. This ratio (hereinafter referred to as a transfer ratio) is appropriately determined within a range satisfying the following conditions.

(Condition A) The load of the microservice of the transfer source decreases to a predetermined value or less For example, the request per unit time input to the microservice of the transfer source decreases to a predeter-mined value or less.

(Condition B) The load of the transfer destination micro-service does not exceed a predetermined value For example, the request per unit time accepted by the microservice of the transfer destination does not exceed a predetermined value.

For example, the load distribution control unit 1 stores a threshold value (for example, a threshold value of the number of requests per unit time) when the microservice is regarded as an overload, and determines a transfer rate such that the load on the target microservice is lower than the threshold value. For example, if the threshold for overload of a given microservice was a 50 request per second and the microservice is receiving a 75 request per second, the load distribution control unit 1 determines to forward the 25 request per second to the other edge server.

The load distribution control unit 1 is configured to be able to monitor the load of the transfer destination microservices, and determines the transfer rate in consideration of the load of the transfer destination microservices. For example, the load distribution control unit 1 determines the transfer rate within a range in which the load of the microservice of the transfer destination does not exceed the threshold. If the transfer of the request may cause the microservice of the transfer destination to be overloaded, another edge server 2 may be added to the candidate of the transfer destination.

The traffic control unit 112 of the load distribution control unit 1 generates a transfer command based on the content determined above, and transmits the transfer command to the target edge server 2. The transfer command includes, for example, the following items.

Identifier of the source edge server.

The source of the request in the source edge server (the entity sending the request to the overloaded microservice)

Destination of the request in the source edge server (i.e., overloaded microservices)

Identifier of the destination edge server

Identifier of the destination microservice

The rate at which requests are forwarded (e.g., a percentage from 0 to 100)

The edge server 2 (the application execution unit 213) that has received the transfer command performs the transfer of the request according to the content. For example, in the edge server 2A, it is assumed that 50 requests are transmitted from the microservice 2131 to the microservice 2132 per second, and 50% is designated as the forwarding rate. Based on the transfer command, the application execution unit 213 of the edge server 2A transfers 25 of the 50 requests per second to the microservices 2132 operating in the edge server 2B. In addition, 30 requests are transmitted from the gateway 212 to the microservice 2132 per second, and the transfer rate is 16. Assume that 7% is specified. Based on the transfer command, the application execution unit 213 of the edge server 2A transfers five of the 30 requests per second from the gateway 212 to the microservice 2132 operating in the edge server 2B.

Through the processing described above, the load distribution control unit 1 can detect an overload state in the plurality of edge servers 2 included in the system and perform load distribution.

Flowchart

Figures 6A, 6B:
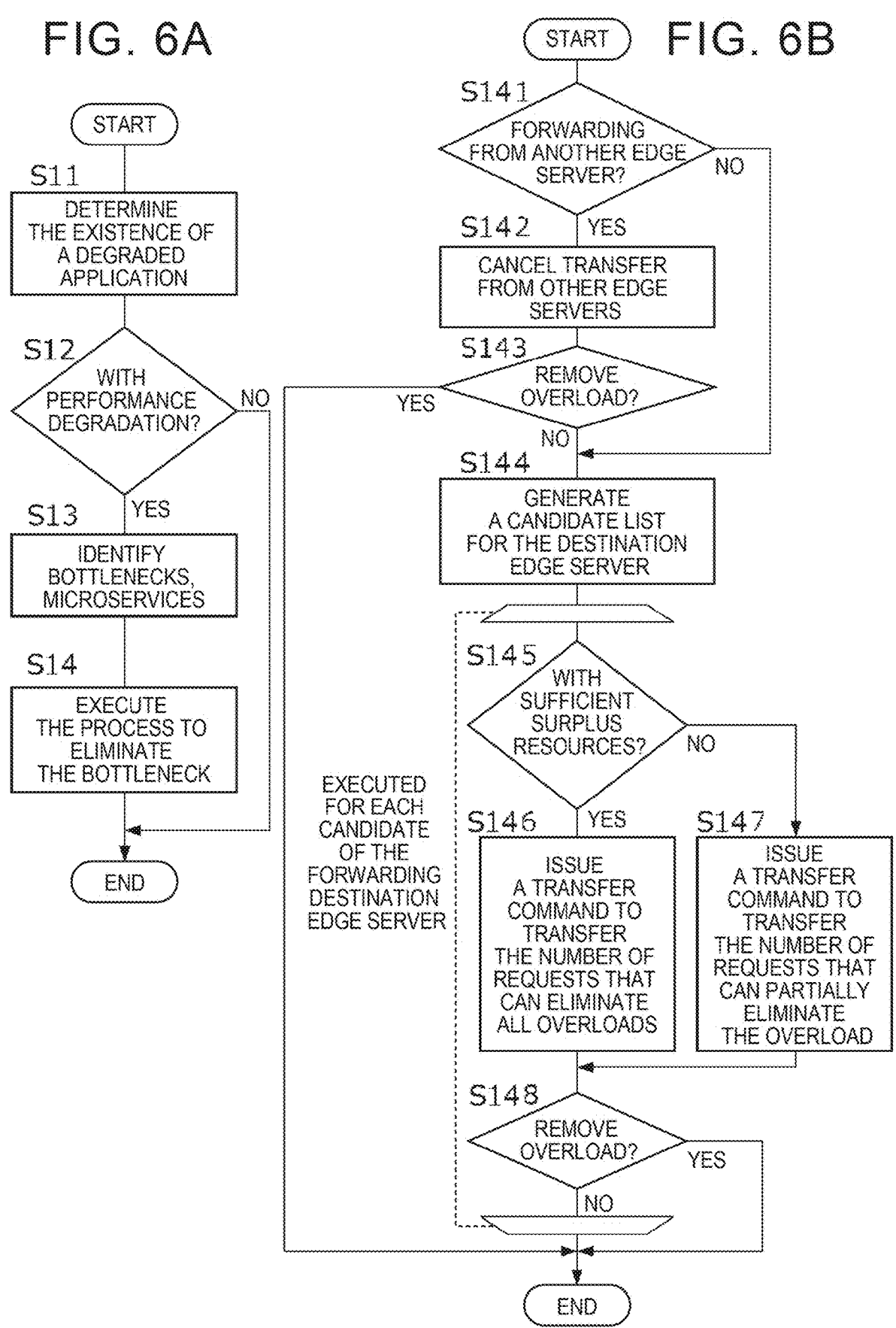
FIG. 6A is a flowchart of processing executed by the load distribution control unit.
FIG. 6B is a flowchart of processing executed by the load distribution control unit.

Next, the details of the processing executed by the load distribution control unit 1 will be described. FIG. 6A is a flowchart of processing executed by the load distribution control unit 1. The illustrated processing is periodically executed for each of the plurality of edge servers during monitoring of the edge server by the load distribution control unit 1.

First, in S11, the monitoring unit 111 determines that there is an application whose performance is deteriorated more than a predetermined value among the applications provided by the plurality of edge servers 2 included in the system.

In this step, the load distribution control unit 1 identifies a plurality of applications to be evaluated by using the edge server 2 and the list of applications recorded in the configuration database 12A. Further, for each of the plurality of applications to be evaluated, a value (hereinafter, a performance evaluation value) for evaluating the performance is acquired via the load notification unit 211 of the edge server

2. The performance evaluation value may be, for example, throughput. In the case where there is an application in which the performance evaluation value is lower than the predetermined performance required value, it can be estimated that a problem has occurred in any of the microservices constituting the application (an overload state).

If it is determined in S11 that there is an application with degraded performance (S12—Yes), the process transitions to S13. If it is determined in S11 that there is no application whose performance is degraded (S12—No), the process ends.

S13 identifies the microservices that are responsible for the performance degradation of the application (i.e., are bottlenecks). In this step, for example, as described with reference to FIG. 5, the monitoring unit 111 acquires the measurement value of the response time for each microservice via the load notification unit 211 of the edge server 2. The monitoring unit 111 uses the acquired measured value of the response time and the response time in a normal state to identify the microservice that is a bottleneck. In the example of FIG. 5, d_slat represents the processing time in each microservice. For example, a difference between d_slat in a normal state and the current d_slat can be obtained for each microservice, and a microservice whose difference exceeds a predetermined value can be regarded as a bottleneck.

Next, in S14, the traffic-control unit 112 executes a process for resolving the identified bottleneck. FIG. 6B is a detailed flow chart of S14 process.

At the timing at which the illustrated flowchart starts, the target edge server 2 and the microservice in the overload state are identified.

In the following description, the target edge server is also referred to as a transfer source edge server. The edge server to which the request is forwarded is also referred to as a forwarding destination edge server.

First, in S141, it is determined whether or not the target microservice is currently being forwarded a request from another edge server. If an affirmative determination is made in this step, the process proceeds to S142. If a negative determination is made in this step, the process proceeds to S144.

S142 halts forwarding of requests from other edge servers. For example, it is conceivable that the target microservice is in an overload state due to the transfer of a request from another edge server, and therefore, an attempt is made to eliminate the overload by stopping the transfer.

In S143, it is determined whether or not the overload condition of the target microservice has been resolved by stopping the forwarding of the request by the other edge server. In this step, a measurement value of the response time may be acquired for the target microservice, and it may be determined whether or not the overload state has been eliminated based on a result of comparing the measurement value with the normal response time. If it is determined that the overload state has been eliminated, the process ends. If the overload condition does not resolve, the process transitions to S144.

In S144, candidates for the destination edge server that is the destination to which the request is forwarded are acquired. In this step, a delay time generated by transferring a request between edge servers is calculated, and it is determined whether or not the performance required value can be satisfied even if the delay time is added. The edge server determined to satisfy the performance request value even if the request is transferred is added to the list as a candidate of the destination edge server. Note that the edge server in which the corresponding microservice is already in an overload state is not subject to this step.

S145 to S148 process is repeatedly executed for each of the candidates of the destination edge server generated by S144.

S145 determines whether there are enough surplus resources to accept the request for the microservices running on the target destination edge server. If the destination microservice is able to accept all the required number of requests forwarding to resolve the overload condition of the target microservice, then this step is an affirmative decision.

If an affirmative determination is made in S145, the process transitions to S146, generates a transfer command for transferring the number of requests that can eliminate the overload to the transfer destination edge server, and transmits the transfer command to the transfer source edge server.

If a negative determination is made on S145, the process proceeds to S147. An affirmative determination in S145 means that the destination edge server does not have a resource that accepts all loads. In this case, a transfer command for transferring a part of the overload (that is, an acceptable number of requests) to the transfer destination edge server is generated, and the transfer command is transmitted to the transfer source edge server.

In S148, it is determined whether or not the overload of the target microservice has been eliminated. If the overload of the target microservice is resolved, the process ends. If the overload of the target microservice has not been resolved, the process returns to S145, and the same process is repeated for the subsequent candidates of the destination edge server.

As described above, the processing of FIGS. 6A and 6B is executed periodically. That is, even after the transfer of the request is started, the predetermined ratio can be changed according to the variation of the load state. In addition, the microservice of the transfer destination can be changed in accordance with the variation of the load condition. For example, when the transfer of the request is started and then the microservice of the transfer destination becomes overloaded, the transfer of the request to the microservice may be stopped or the microservice of the transfer destination may be changed.

As described above, in the edge computing system according to the first embodiment, among the microservices operating in each of the plurality of edge servers, the microservices loaded by a predetermined amount or more are specified. Further, a predetermined ratio of requests issued to the microservice is forwarded to the microservice operating in another edge server. As a result, it is possible to detect that an overload condition has occurred in units of microservices and to perform load balancing.

Modification

The above-described embodiments are merely examples, and the present disclosure can be appropriately modified without departing from the gist thereof. For example, the processes and means described in the present disclosure can be freely combined and implemented as long as there is no technical inconsistency.

Further, the processing described as being performed by one apparatus may be performed by a plurality of apparatuses in a shared manner. Alternatively, the processes described as being performed by different devices may be performed by a single device. In a computer system, it is possible to flexibly change which hardware configuration (server configuration) realizes each function.

For example, in the description of the embodiment, the load distribution control unit 1 detects that the performance of the application running on the edge server has deteriorated, but the processing may be triggered from the edge server 2 to the load distribution control unit 1.

Further, in the description of the embodiment, an example in which the processing time of each microservice is measured as a method for specifying the microservice in the overload state has been described, but the microservices in the overload state may be specified by other methods. For example, if the number of requests received per unit time can be acquired for each microservice, this may be used.

The present disclosure can also be realized by supplying a computer program implementing the functions described in the above embodiments to a computer, and reading and executing the program by one or more processors included in the computer. Such a computer program may be provided to a computer by a non-transitory computer readable storage medium connectable to a system bus of the computer, or may be provided to the computer via a network. Non-transitory computer-readable storage media include, for example, any type of disk, such as a magnetic disk (floppy disk, hard disk drive (HDD), etc.), optical disk (CD-ROM, DVD disk, Blu-ray disk, etc.). Non-transitory computer-readable storage media include, for example, read only memory (ROM), random access memory (RAM), EPROM, EEPROM, magnetic cards, flash memory, optical cards, any type of media suitable for storing electronic instructions.

What is claimed is:

1. An information processing device, comprising:
a processor; and
a memory storing executable instructions that cause the processor to
acquire load information indicating a load on one or more microservices operating in each of a plurality of edge servers;
determine whether the load information indicates the load on a first microservice of the one or more microservices is at or above a threshold load, the first microservice operating on a first edge server of the plurality of edge servers;
generate a transfer command in response to the determination that the load information indicates the load on the first microservice is at or above the threshold load; and
transmit the transfer command to the first edge server and to a gateway, wherein the transfer command causes
the first edge server to transfer a first predetermined portion of requests issued to the first microservice from the first edge server to a second microservice operating on one or more other edge servers of the plurality of edge servers, and
the gateway to forward a second predetermined portion of requests forwarded from the gateway to the second microservice operating on the one or more other edge servers, instead of the first microservice.

2. The information processing device according to claim 1, wherein
the one or more microservices undertake processing by a first application running on the first edge server, and
the executable instructions further cause the processor to measure a processing time of each of the one or more microservices when a value related to performance of the first application deteriorates from a predetermined value, and
designate a microservice of the one or more microservices in which the processing time exceeds a threshold processing time as the first microservice.

3. The information processing device according to claim 1, wherein the processor determines the certain proportion such that both the load on the first microservice and the load on the second microservice are below the threshold load.

4. The information processing device according to claim 1, wherein, after transferring the certain proportion of requests has started, the processor stops transferring the certain proportion of requests when the load on the second microservice exceeds the threshold load.

5. A non-transitory storage medium storing a program that causes a computer to execute:

acquiring load information indicating a load on one or more microservices operating in each of a plurality of edge servers;

determining whether the load information indicates the load on a first microservice of the one or more microservices is at or above a threshold load, the first microservice operating on a first edge server of the plurality of edge servers;

generating a transfer command in response to determining that the load information indicates the load on the first microservice is at or above the threshold load; and transmitting the transfer command to the first edge server and to a gateway, wherein the transfer command causes the first edge server to transfer a first predetermined portion of requests issued to the first microservice from the first edge server to a second microservice operating on one or more other edge servers, and the gateway to forward a second predetermined portion of requests from the gateway to the second microservice operating on the one or more other edge servers.

* * * * *